March 19, 1940.  C. G. EISENBERG, JR  2,194,068
SIDE DUMP VEHICLE
Filed May 6, 1938  3 Sheets-Sheet 1
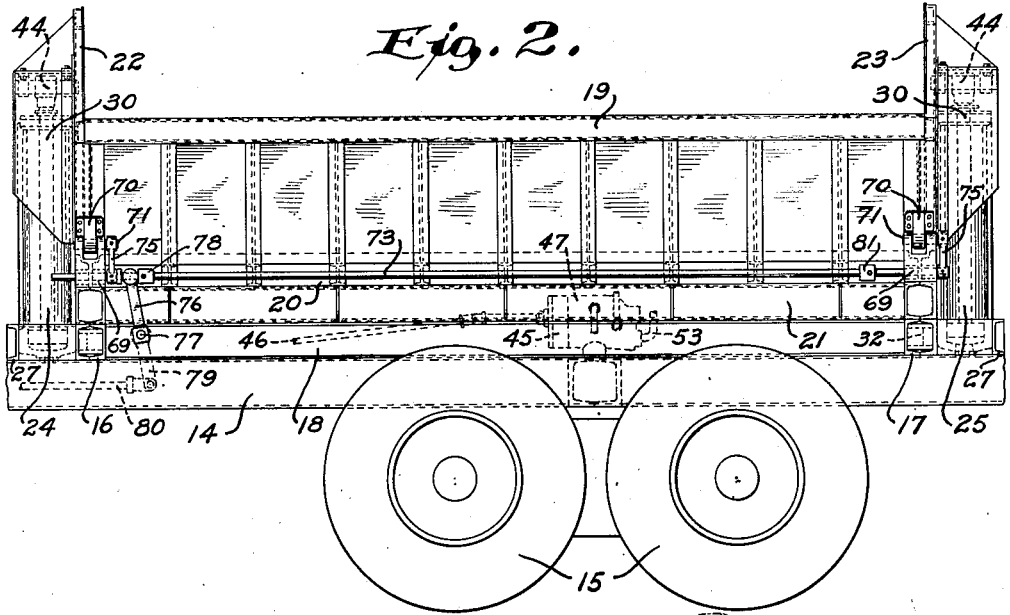
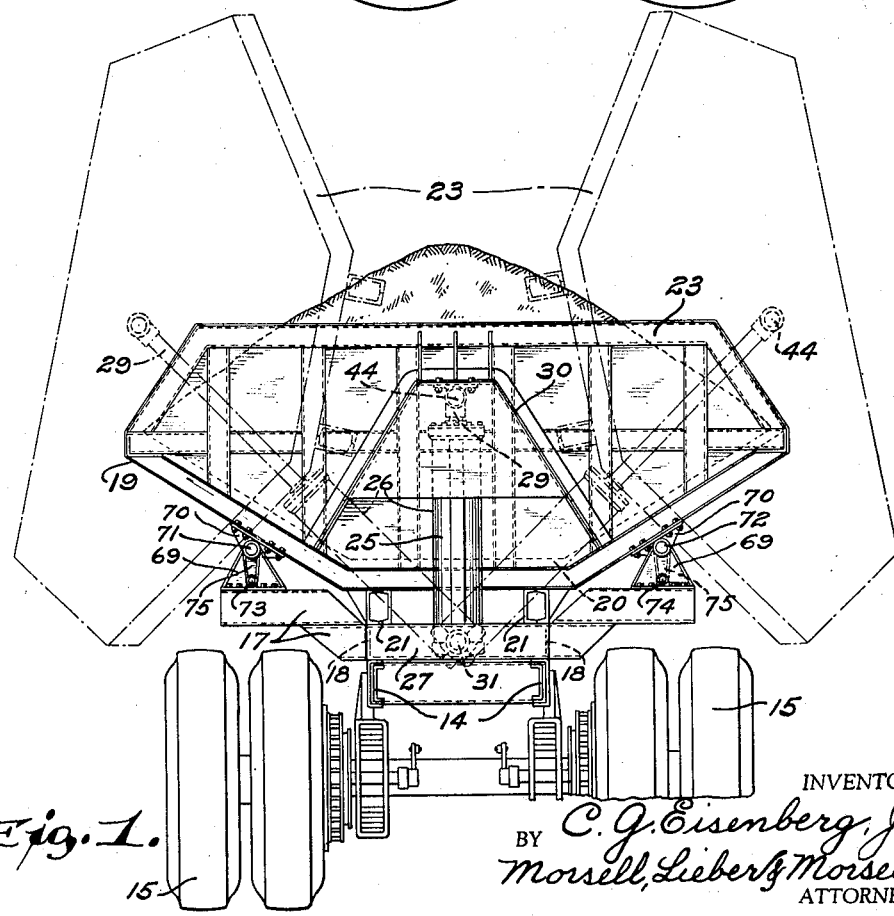
INVENTOR.
C. G. Eisenberg, Jr.
BY Morsell, Lieber & Morsell
ATTORNEYS.

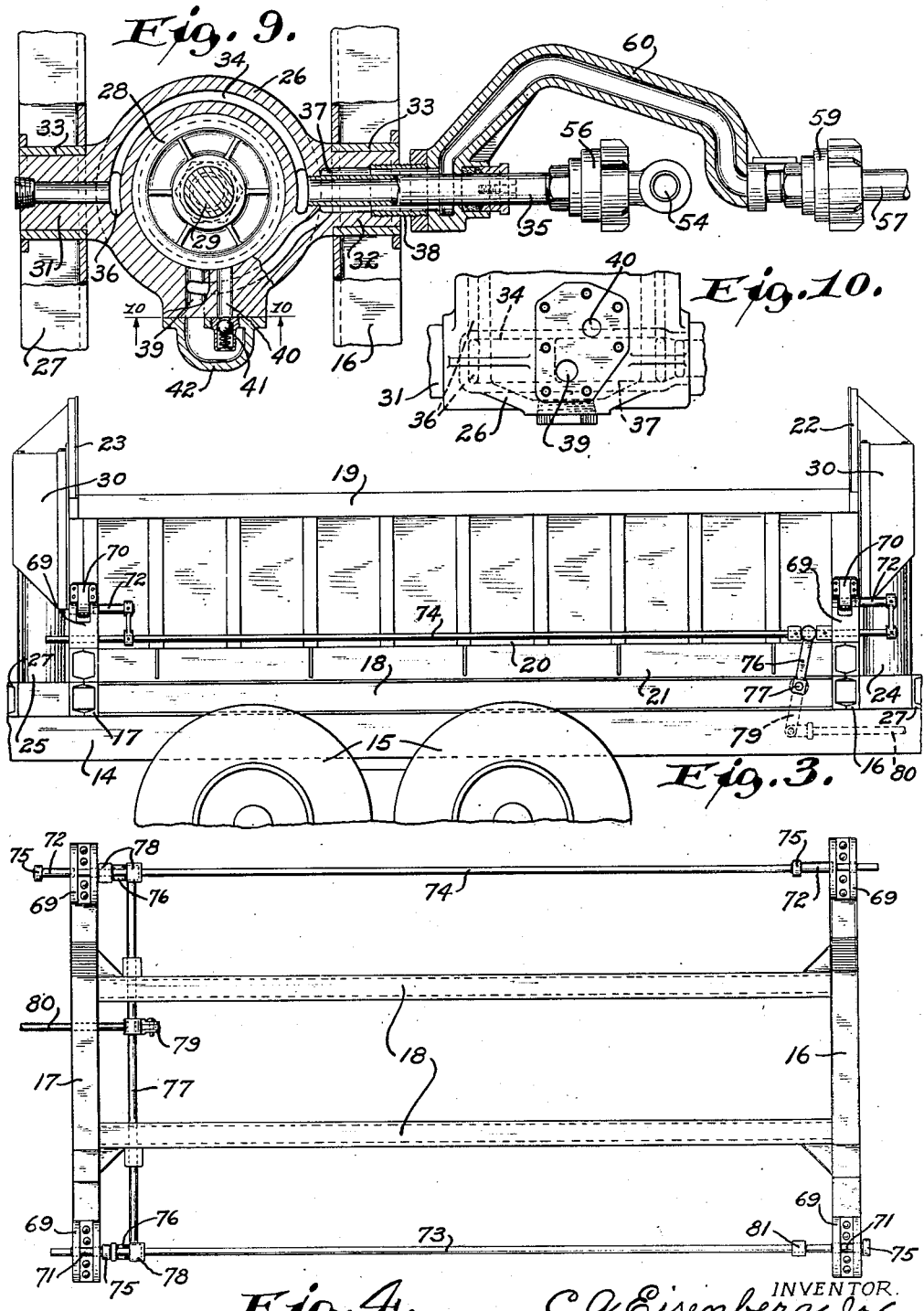

March 19, 1940.  C. G. EISENBERG, JR  2,194,068
SIDE DUMP VEHICLE
Filed May 6, 1938  3 Sheets-Sheet 3
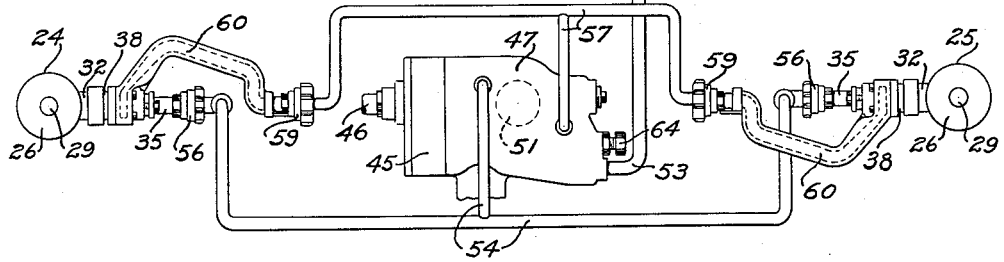
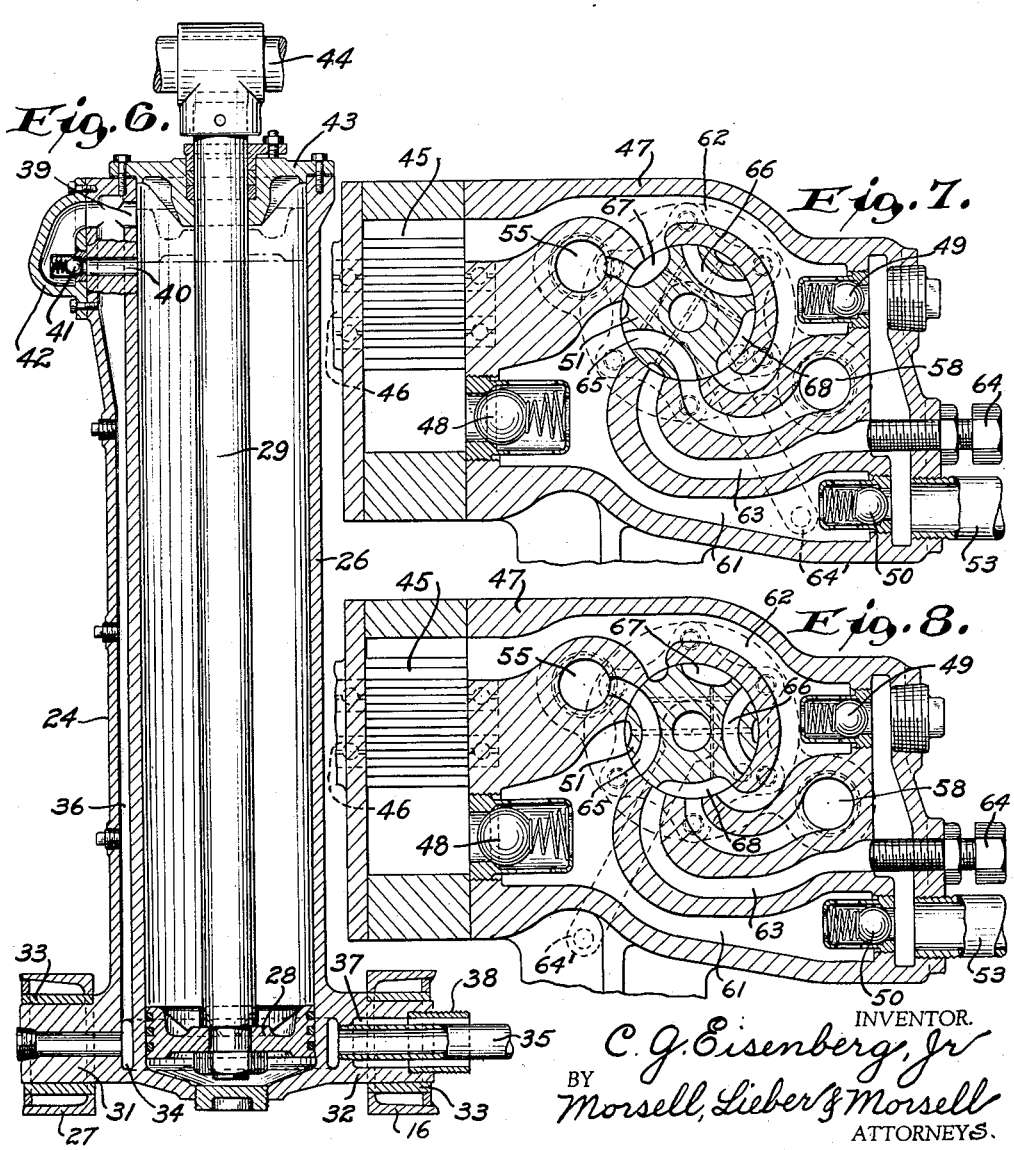

Patented Mar. 19, 1940

2,194,068

UNITED STATES PATENT OFFICE 2,194,068

SIDE DUMP VEHICLE

Charles G. Eisenberg, Jr., Wauwatosa, Wis., assignor to The Heil Co., Milwaukee, Wis., a corporation of Wisconsin Application May 6, 1938, Serial No. 206,354

4 Claims. (Cl. 298—18)

My present invention relates generally to improvements in the art of transporting materials in bulk, and relates more specifically to improvements in the construction and operation of mechanism for effecting side dumping of vehicular load carrying bodies in either direction.

Generally defined, an object of the present invention is to provide an improved hydraulic assemblage for effecting side dumping in either direction, of a vehicular load confining and carrying body having relatively large capacity.

Some of the more specific objects of my invention are as follows:

To provide an improved load carrying body especially applicable to road vehicles and having enormous capacity, and which is adapted to be quickly and effectively dumped toward either side with the aid of relatively compact double-acting hydraulic hoists or jacks.

To provide simplified and compact double-acting hydraulically actuated mechanism for dumping the load from a transporting body tiltably mounted upon a vehicle, which is readily manipulable and which utilizes minimum power.

To provide an improved hydraulic system for effecting side dumping of a vehicle supported load carrying body, from a remote station and during normal advancement of the vehicle.

To provide an improved double-acting hydraulic jack system for effecting actuation of a truck dump body, which is compact and reliable in operation, and wherein similar double-acting hydraulic jacks are utilized to effect dumping in either direction.

To provide various improvements in the details of construction and operation of side dump vehicles, whereby massive loads may be conveniently dumped in a most effective manner, and with greatest speed and safety.

These and other specific objects and advantages of my present invention will be apparent from the following description.

A clear conception of the several features constituting the present improvement, and of the mode of constructing and operating side dump vehicle assemblages built in accordance with the invention, may be had by referring to the drawings accompanying and forming a part of this specification wherein like reference characters designate the same or similar parts in the various views.

Fig. 1 is a rear view of one of the improved side dump vehicles, showing the body in normal load carrying position in solid lines, and in dumping positions in dot-and-dash lines;

Fig. 2 is a side elevation of the assemblage of Fig. 1, with the body in normal load carrying position, and with the body pivot pins on the visible side in active position;

Fig. 3 is an opposite side elevation of the same assemblage, with the body again in load carrying position, and showing the body pivot pins on the visible side in inactive position;

Fig. 4 is a skeleton plan view of the chassis and of the body pivot pins and of the actuating mechanism therefor;

Fig. 5 is a somewhat diagrammatic plan view of the hydraulic actuating system for tilting the body in either direction;

Fig. 6 is an enlarged central longitudinal vertical section through one of the hydraulic jacks or hoists;

Fig. 7 is a similarly enlarged horizontal section through the pressure supply pump and the distributing valve, showing the latter in body elevating or tilting position;

Fig. 8 is a similar section through the pump and control valve, showing the valve in normal position as when the body is in load carrying position;

Fig. 9 is a similarly enlarged irregular transverse section through the lower portion of the hoist of Fig. 6 and through a fragment of the liquid distributing pipes associated therewith; and Fig. 10 is a side view of a fragment of the lower hoist portion, taken along the line 10—10 of Fig. 9 and with the hoist valve confining cap removed.

While I have shown the invention herein as being specifically applied to a hydraulically actuated system for effecting interchangeable opposite side dumping of a special type of road vehicle dump body, it is not the intention to thereby unnecessarily restrict the scope.

Referring to the drawings, the improved side dump road vehicle illustrated therein comprises in general an ordinary truck chassis 14 spring supported upon transporting wheels 15 in the usual manner and having relatively heavy transverse beams 16, 17 mounted thereon and extending outwardly of the chassis 14 over the paths of travel of the wheels 15, the beams 16, 17 preferably being rigidly interconnected and spaced apart by means of longitudinally extending channel beams 18 disposed directly over the side beams of the chassis 14; a load carrying body 19 having a downwardly concave bottom 20 provided with parallel longitudinally extending reenforcing and seating beams 21 adapted to coact with the beams 16, 17, 18, and being further provided with upright front and rear end walls 22, 23 respectively, located in approximately vertical alinement with the corresponding transverse beams 16, 17; front and rear hydraulic hoists or jacks 24, 25 each having a cylinder 26 trunnion supported at its lower end medially of the chassis 14 between the adjacent beams 16, 17 and other transverse beams 27, and also each having a piston 28 and rod 29, the latter of which are pivotally attached to inverted U-shaped braces 30 secured to the end walls 22, 23; mechanism for admitting liquid to and from the hoists 24, 25; and pivot means for tiltably suspending the body 19 from the beams 16, 17 for dumping of the load in either direction sidewise of the vehicle.

The substructure for mounting the body assemblage upon the chassis 14, including the beams 16, 17, 18, 27, is preferably formed of relatively heavy structural metal bars welded or otherwise rigidly interconnected; and the body 19 together with its reenforcing beams and braces is likewise formed of durable metal plates and bars rigidly interconnected as by welding. The body 19 substantially constitutes a cradle disposed between the two similar hydraulic hoists 24, 25, and as indicated in Figs. 1 and 2, this load carrying cradle normally rests upon the fixed beams 16, 17, 18, 27 through the beams 21 which are welded or otherwise rigidly attached to the body bottom 20 by welding or the like. The body 19 together with its substructure and its actuating hoists, may be assembled as a unit and subsequently mounted upon the truck chassis 14.

As previously indicated, the hydraulic jacks or hoists 24, 25 are of like construction, and the cylinder 26 of each of these jacks has alined trunnions 31, 32 at its lower end, coacting with bearings 33 carried by the adjacent transverse beams 16, 17, 27, see Figs. 6 and 9. The lower portion of each cylinder 26 is also provided with a semicircular port 34 connecting an inner pipe 35 which is disposed centrally within the trunnion 32, with a port 36 formed within and extending to the upper end of the cylinder 26; and each cylinder 26 is furthermore provided with another lower port 37 connecting an outer pipe 38 with the lower end of the piston displacement chamber. The ports 36, 37 are communicable directly with the extreme ends of the cylinder bore through lateral openings 39; and indirectly with this bore somewhat removed from the cylinder ends, through passages 40 and past spring pressed check valves 41 confined within removable caps 42, see Figs. 6, 9 and 10. The piston 28 of each jack is slidable within the corresponding cylinder bore and is of such width that when it is in either of the extreme end positions, the corresponding end opening 39 and passage 40 will be at least partially uncovered as indicated in dot-and-dash lines in Fig. 6. The piston rod 29 of each hoist, slidably penetrates an upper removable cylinder head 43, and the upper end of each rod 29 is pivotally attached to the adjacent body brace 30 by means of a pivot pin 44. All similar parts of the two hydraulic jacks 24, 25 are interchangeable, and these jacks are swingable about alined lower axes extending longitudinally and disposed centrally of the transporting vehicle; and the axes of the pins 44 are likewise alined.

The system for supplying actuating liquid such as oil to the jacks, is shown diagrammatically in Fig. 5, and more in detail in Figs. 6, 7, 8 and 9, and this system comprises a pump 45 adapted to be driven from the motor of the transporting vehicle through a shaft 46; a valve casing 47 secured to the pump 45 and providing a housing for automatic valves 48, 49, 50 and for a manually operable control valve 51; a liquid supply reservoir 52 communicating with the casing 47 through a pipe 53; piping 54 connecting a passage 55 in the casing 47 with the inner pipes 35 of the jacks 24, 25 through high pressure swing joints 56; and other piping 57 connecting a passage 58 in the casing 47 with the outer pipes 38 of the jacks 24, 25 through other high pressure swing joints 59 and U-shaped conduits 60. The pump 45 as shown, is of the gear type, and may be supported in any suitable manner either from the chassis 14 or from the beams 18, beneath the body 19; and the automatic valve 48 constitutes the pump discharge valve and is interposed between the discharge side of the pump rotors and a duct 61 formed within the casing 47. The automatic valve 49 is ordinarily the suction valve of the pump 45, being interposed between the reservoir pipe 53 and a duct 62 leading to the pump inlet; while the valve 50 which is similar to the valve 49, is located between the liquid supply pipe 53 and the high pressure duct 61. The casing 47 is also provided with a by-pass duct 63 and with an adjustable by-pass valve 64 located between this duct 63 and the reservoir pipe 53; and the manual control valve 51 is of the rotary balanced type and is adapted to be operated by means of a lever 64' from the vehicle driver's cab through suitable connections. The control valve 51 has ports 65, 66, 67, 68, of which the port 65 is adapted to interchangeably connect either the passage 55 or the passage 58, with the high pressure duct 61; while the port 66 is an inactive port used primarily for counterbalancing purposes. The port 67 is adapted to connect the passage 55 with the suction duct 62; while the port 68 is formed to connect the passage 58 with the suction and by-pass ducts 62, 63 under certain conditions of operation. The construction of the swing joints 56, 59 is relatively standard, being such that the pipes 35, 38 and the U-shaped conduits 60 may oscillate with their respective hoists 24, 25 during dumping of the body 19 in either direction, without permitting escape of the liquid at the joints.

In order to permit such tilting or dumping of the load carrying body 19 in either direction, suitable means must be provided for pivotally suspending the body at one side of the vehicle and for releasing the opposite side during dumping of the load toward either side. This I have done as illustrated in Figs. 1, 2, 3 and 4, and the mechanism for effecting the desired result comprises in general four similar bifurcated pivot brackets 69 rigidly attached to the outer ends of the transverse beams 16, 17; other brackets 70 secured to the adjacent inclined bottom portions of the body 19 and having through openings which are alineable with openings in the bifurcations of the adjacent brackets 69 when the body is in normal horizontal position; pivot pins 71, 72 of which the pins 71 are coaxial and disposed on one side of the chassis 14, while the pins 72 are also coaxial but disposed on the opposite side; parallel rods 73, 74 slidably mounted in lower through openings in the fixed brackets 69 and being rigidly but adjustably connected to the pins 71, 72 respectively by means of vertical arms 75; levers 76 carried by a transverse shaft 77 and coacting with spaced collars 78 secured to the rods 73, 74; and an actuating arm 79 secured to the medial portion of the shaft 77 and being operable from the vehicle driver's cab through a connection 80. The sliding motion of the rods 73, 74 is limited by the arms 75 and stop collars 81 secured to these rods, and the pins 71, 72 cannot be entirely withdrawn from the holes in the fixed brackets 69, but may be interchangeably withdrawn from the brackets 70 so that the body 19 may be swung either in one direction about the alined pivot pins 71, or in the opposite direction about the pins 72, and may be locked in horizontal position by merely setting the lever 79 in mid-position.

During normal operation of my improved side dump vehicle, the body 19 is ordinarily locked in horizontal or neutral position by properly setting the lever 79, and the pump 45 of the hydraulic system may be idle or operating with the manual control valve 51 set in a position wherein the valve port 65 connects the duct 61 directly with the duct 62. The body 19 may then be loaded with material as shown in solid lines in Fig. 1, and may thereafter be transported from place to place by propelling the carrying vehicle with the aid of its driving motor in a well known manner. If it becomes desirable to dump the load, the lever 79 should first be shifted with the aid of the cab connection 80 to shift one set of pins 71 or 72 into active position and to simultaneously shift the other set out of active position. As illustrated in Figs. 2, 3 and 4, the pins 71 have been shifted into active position from normal intermediate position, and the pins 72 are inactive, so that the body 19 may be swung away from the rod 74 and pins 72 about the active pivot pins 71.

After this manipulation of the pins 71, 72 has been effected, the hydraulic jacks 24, 25 may be operated by actuating the pump 45 and by shifting the control valve 51 into the position shown in Fig. 7. The displacement chambers beneath both pistons 28 will then be connected to the pressure or discharge duct 61 of the pump 45 through the lower cylinder openings 39, ports 37, pipes 38, conduits 60, swing joints 59, piping 57, passage 58, and valve ports 65; and the upper piston displacement chambers of the jacks will be simultaneously conected with the pump suction duct 62 through the upper opening 39, ports 36, 34, pipes 35, swing joints 56, piping 54, passage 55, and valve port 67, and the pump 45 will withdraw liquid from the reservoir 52 through pipe 53 past the valve 49. Liquid under pressure will thereupon be simultaneously admitted beneath the pistons 28 and the pressure will be released above the pistons thereby causing the pistons 28 and rods 29 to rise and to dump the body 19 about the pivot pins 71. During this operation of the jacks and tilting of the body 19, the hoist assemblages will swing with the body about their supporting trunnions 31, 32 and this swinging of the jacks will be permitted by the axially alined swing joints 56, 59 without permitting liquid to escape. As the pistons 28 and rods 29 reach the uppermost limits of travel, the pistons automatically uncover the upper cylinder passages 40 and liquid under pressure from beneath the pistons 28 is then free to escape past the upper check valves 41 and returns to the pump suction duct 62. The hydraulic jacks 24, 25 will however be retained in this expanded condition so long as the valve 51 is maintained in the position shown in Fig. 7.

When it becomes desirable to return the body 19 to horizontal or neutral position, the control valve 51 should be moved to the position shown in Fig. 8, with the aid of the lever 64'. The displacement chambers beneath the pistons 28 will then be connected to the pump suction duct 62 through the lower openings 39, ducts 37, pipes 38, conduits 60, swing joints 59, piping 47, passage 58, and valve port 68; and the upper piston displacement chambers will be simultaneously connected to the pump discharge duct 61 through the upper cylinder openings 39, ducts 36, 34, pipes 35, swing joints 56, piping 54, passage 55, and valve port 65, and the pump 45 will then withdraw liquid from beneath the pistons 28 and will force the same into the cylinders above these pistons while the excess liquid will escape through the duct 63 and past the by-pass valve 64 to the supply reservoir 52. The pistons 28 will thus be lowered within the cylinders 26 of both jacks 24, 25, and the body 19 will be returned to normal position, and when the pistons reach the lower end of their strokes, continued admission of liquid under pressure to the upper displacement chambers will cause the automatic check valves 41 at the lower ends of the cylinders 26 to open and will permit the excess liquid to escape through the lower passages 40 to the port 37 and from thence to the suction duct 62 until the pump 45 is stopped or the valve 51 is further adjusted to directly connect the pump discharge and suction ducts 61, 62 through the valve port 65.

When the body 19 has been returned to normal position with the beams 21 thereof resting upon the fixed beams 18, it may either be locked in that position by setting the pivot actuating lever 79 in mid-position, or it may be prepared for dumping in the opposite direction by adjusting the lever 79 so as to make the pivot pins 72 active while simultaneously withdrawing the pins 71 from the body brackets 70. Subsequent operation of the jacks 24, 25 in the manner described, will then cause the body 19 and the hoist cylinders 26 to swing so as to dump the load over the pivot pins 72. It will thus be apparent that the body 19 may be readily dumped in either direction, or locked in neutral position, and that all operations are conveniently controllable from the driver's cab.

From the foregoing detailed description of the construction and operation of the improved assemblage, it will be noted that my present invention provides simple, compact and durable mechanism, for effecting rapid dumping of the load toward either side of the transporting vehicle outwardly beyond the vehicle wheels 15, without danger of tipping of the vehicle structure and with the aid of simple double-acting hydraulic hoists or jacks. This advantageous operation is due to the location of the pivot pins 71, 72 approximately half-way between the central longitudinal axis of the vehicle and the outer side edge of the load carrying body, and such location of the pivots also reduces to a minimum the size and stroke of the double-acting hydraulic jacks 24, 25 and enhances the speed of dumping. These hydraulic jacks are compact in structure but are highly efficient in operation; and by simultaneously actuating both hoists with the aid of a single control valve, uniform tilting of the entire body 17 is assured. The entire hydraulic control system has also been reduced to its simplest form by the use of double-acting hoists, and possible leakage has been eliminated by the use of the alined high pressure swing joints 56, 59 which permit oscillation of the cylinders 26 without permitting escape of actuating liquid. The dump body assemblage may moreover be completely assembled upon the subframe comprising the beams 17, 18, 27 and may thereafter be mounted as a unit upon the vehicle chassis 14. The cost of constructing my improved assemblage is also comparatively low, because the two double-acting hoists associated with the opposite ends of the body and which effect dumping in either direction, are of like and interchangeable construction, and are far more simple than the telescopic hoists and other mechanisms heretofore used in similar dumping systems. The improved pivotal mounting of the hoists 24, 25 and the direct connection of these hoists to the body, is of extreme importance, since this improved mounting permits effective delivery of the actuating liquid to and from the double-acting hoists for operation in either direction. The improved assemblage has proven highly satisfactory and successful in actual commercial use, and the working parts thereof are obviously well protected against possible damage.

It is to be understood that it is not desired to limit the invention to the exact details of construction or the precise mode of use, herein shown and described, for various modifications within the scope of the claims may occur to persons skilled in the art.

I claim:

1. In combination, a vehicle chassis having a liquid supply reservoir and a pump fixedly mounted thereon, a body interchangeably tiltable toward either side of said chassis, a double-acting hydraulic jack adjacent each end of said body for tilting the latter in either direction, each of said jacks having a cylinder trunnion at its lower extremity supported from said chassis and a piston movable in its cylinder and pivotally attached at its upper extremity to the upper portion of the adjacent body end, and said trunnions having concentric passages for conducting liquid under pressure from said pump and reservoir to and from both piston displacement chambers of both of said cylinders, and a swivel connection between each of said trunnions and the adjacent fixed piping communicating with said supply reservoir.

2. In combination, a vehicle chassis having a liquid supply reservoir and a pump fixedly mounted thereon, a body interchangeably tiltable toward either side of said chassis, a double-acting hydraulic jack adjacent each end of said body for tilting the latter in either direction, each of said jacks having a cylinder trunnion at its lower extremity supported from the vehicle chassis and a piston movable in its cylinder and pivotally attached at its upper extremity to the upper portion of the adjacent body end, said cylinders each having ducts formed directly therein and communicating with the upper and lower displacement chamber thereof, and said trunnions having concentric ducts therein for conducting liquid under pressure from said pump and reservoir to and from both of said piston displacement chambers through said cylinder ducts, and a swivel connection between each of said trunnions and the adjacent fixed piping communicating with said supply reservoir.

3. In combination, a vehicle, a body tiltably mounted upon said vehicle, a double-acting hydraulic jack adjacent each end of said body for tilting the latter in either direction, each of said jacks having a cylinder trunnion at its lower extremity supported from the vehicle chassis and a piston movable in its cylinder and pivotally attached at its upper extremity to the upper portion of the adjacent body end, said trunnions having concentric passages for conducting liquid under pressure from a fixed source of supply to and from the upper and lower piston displacement chamber of both of said cylinders, and a swivel connection between each of said trunnions and adjacent fixed piping communicating with said source of supply.

4. In combination, a vehicle, a body tiltably mounted upon said vehicle, a double-acting hydraulic jack for tilting the body in either direction, said jack having a cylinder trunnion at its lower extremity supported from the vehicle chassis and a piston movable in its cylinder and pivotally attached at its upper extremity to the upper portion of the body, said trunnion having concentric passages for conducting liquid under pressure from a fixed source of supply to and from the upper and lower piston displacement chambers of said cylinder, and a swivel connection between said trunnion and adjacent fixed piping communicating with said source of supply.

CHARLES G. EISENBERG, JR.